United States Patent [19]

Van Poucke et al.

[11] 4,450,223

[45] May 22, 1984

[54] DIFFUSION TRANSFER MATERIAL AND PROCESS

[75] Inventors: Raphaël K. Van Poucke, Berchem; Christian C. Van de Sande, Belsele; Andreé Verhecken, Mortsel, all of Belgium

[73] Assignee: AGFA-Gevaert, N.V., Mortsel, Belgium

[21] Appl. No.: 466,316

[22] Filed: Feb. 14, 1983

[30] Foreign Application Priority Data

Mar. 16, 1982 [GB] United Kingdom ................. 8207583

[51] Int. Cl.³ ......................... G03C 1/40; G03C 1/10; G03C 5/54; G03C 1/48

[52] U.S. Cl. .................................... 430/223; 430/218; 430/219; 430/227; 430/543; 430/559; 430/566; 430/570; 430/598; 430/599; 430/606; 430/621; 430/564; 430/955; 430/957; 430/958; 430/960

[58] Field of Search ............... 430/218, 219, 223, 443, 430/544, 566, 955, 957, 958, 960, 543, 559, 542, 212, 505, 570, 227, 234, 598, 606, 599, 621, 564

[56] References Cited

U.S. PATENT DOCUMENTS

| | | | |
|---|---|---|---|
| 4,139,379 | 2/1979 | Chasman et al. | 430/223 |
| 4,139,389 | 2/1979 | Hinshaw et al. | 430/223 |
| 4,369,243 | 1/1983 | Credner et al. | 430/223 |
| 4,381,339 | 4/1983 | Renner et al. | 430/223 |

*Primary Examiner*—Richard L. Schilling
*Attorney, Agent, or Firm*—A. W. Breiner

[57] ABSTRACT

A photographic silver halide material comprising a compound which is capable of being reduced by a silver halide developing agent at a rate slower than that of image-wise developable silver halide and in reduced state is capable of releasing a photographically useful group, characterized in that said compound corresponds to the following formula:

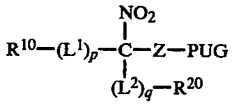

wherein:

$R^{10}$ and $R^{20}$ (same or different)

(1) represent an alkyl group, a cycloalkyl group, an alkenyl group, a cycloalkenyl group or an aralkyl group including said groups in substituted form, (2) represent an aryl group including a substituted aryl group, or (3) represent a heterocyclic ring residue including such residue in substituted form, or $R^{10}$ and $R^{20}$ are ringclosed, either $R^{10}$ or $R^{20}$ containing a ballasting group conferring diffusion resistance to the compound in hydrophilic colloid media when penetrated by an aqueous alkaline liquid;

$L^1$ and $L^2$ (same or different) represent a

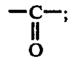

$-SO_2-$; $-NHCO-$; $-NHSO_2-$;

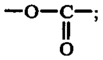

$-O-SO_2-$ or

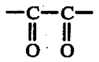

group;

p and q (same or different) represent an integer 0 or 1;

Z represents an atom or an atom group which is electronegative with respect to carbon, and PUG represents together with Z a releasable photographically useful group.

14 Claims, No Drawings

DIFFUSION TRANSFER MATERIAL AND PROCESS

The present invention relates to a photographic material containing at least one silver halide photo-sensitive image-recording layer to which is associated operatively at least one non-diffusible substance which as a result of a reduction yields a mobile, photographically useful compound, in particular a diffusible dye suitable for diffusion transfer photography.

Photographic diffusion transfer processes have been known for several years and are summarized e.g. in "Imaging Systems" by Kurt I. Jacobson and Ralph E. Jacobson, 1977, The Focal Press.

Photographic image-transfer processes are based upon image formation in a photosensitive image-recording layer and diffusion in an image-wise pattern of at least one substance out of said layer to form an image in an adjacent image-receiving layer and/or to leave an image-wise distributed substance in the recording layer.

In diffusion transfer colour processes a dye providing substance is associated with a silver halide emulsion. The coloured image is produced by conversion of the initially non-diffusible dye-providing substance into a diffusible form or a diffusible product as a result of a silver halide development related chemical reaction. The mobilized dyes or dye-precursors thus produced diffuse into a receiving layer where the final coloured image is retained.

Most frequently the transferred dye-image is to be a positive image of the original so that the dye diffusion transfer process should bring about an image reversal when the image recorded in a silver halide material is negative. This reversal can be achieved either in the silver halide development step or in the image-wise production of (a) diffusible dye(s) from initially non-diffusible dye providing substances.

Depending upon the type of silver halide emulsion used different kinds of dye providing systems are required to produce a positive transferred dye image.

If direct-positive silver halide emulsions are used positive image production with respect to the original requires that the dye providing system must yield (a) diffusible dye(s) in the non-exposed areas to an extent which is directly proportional to the degree of non-exposure, whereas no such diffusible dye(s) should be released in the exposed areas. Among the systems fulfilling this requirement are the so-called diffusible dye releasing (DDR) compounds described e.g. in U.S. Pat. No. 3,227,550, U.S. Pat. No. 3,443,940 and U.S. Pat. No. 3,751,406. Other suitable systems apply dye-releasing redox (DRR) compounds which cleave upon oxydation whereas their reduced state is stable to the processing conditions. When such DRR compounds are used in association with a developing silver halide emulsion of the direct-positive type cross-oxydation of the non-diffusible DRR compound with oxidized silver halide developer yields an alkali-labile oxidation product in the non-exposed areas only and hence a positive image-wise distribution of diffusible dye. Examples of image-wise cleaving DRR compounds are described in U.S. Pat No. 3,628,952, GB-Pat. No. 1,405,622, DE-OS No. 2,645,656 and Research Disclosures 12 832 (1974) and 15 157 (1976).

For image reversal with negative silver halide emulsions the dye providing system should yield likewise diffusible dyes in the unexposed areas and progressively block the release of dye in the exposed areas depending on the degree of exposure. So-called dye-developers, e.g. those described in U.S. Pat. No. 2,983,606, are suitable for this purpose. These compounds are soluble in the alkaline processing fluids and hence are diffusible; in the exposed areas, however, cross-oxidation with oxidized silver halide developer will turn them into non-soluble, non-diffusible oxidation products.

According to another reversal process so-called IHO (Inhibited hydrolysis by oxydation) compounds can be used. The IHO compounds carry a ballast group and are initially immobile in the hydrophilic colloid layer wherein they are incorporated. Their main characteristic is that they are alkali-labile in reduced state so as to release a diffusible dye in the unexposed areas. In the exposed areas the IHO-compounds cross-oxidize with oxidized silver halide developer and are converted into their alkali-stable, still ballasted oxidized counterparts. Examples of IHO-compounds are described in DE-OS Nos. 2,402,900, 2,543,902 and 2,654,213.

An alternative to these IHO-compounds are the IHR (Increased Hydrolysis by Reduction) compounds.

Said IHR-compounds are used in ballasted diffusion-resistant form and may be IHO-compounds in oxidized state or in general compounds wherefrom by reduction and hydrolysis a diffusible photographically useful group (PUG) is released. The IHR-compounds react neither directly nor indirectly with oxidizing substances, e.g. the oxidation product of developers, so that their diffusion resistance at the exposed areas can not be changed. They are, however, capable of reacting with reducing compounds, e.g. by direct or indirect reaction with non-oxidized photographic developer which remains at the non-exposed areas of negative working silver-halide emulsion layers. By reduction a hydrolysable compound is obtained wherefrom a diffusion-mobile part being or including a photographically useful group e.g. dye or dye precursor is set free which is capable to diffuse into an image receiving layer where it is fixed.

In a preferred embodiment the IHR-compounds are used in conjunction with an electron-donor compound (ED-compound) or electron donor-precursor compound (EDP-compound) which yield the electrons necessary for the PUG-releasing reaction. In order to have a better control on the desired sequence of reactions the ED- or EDP-compounds are used preferably in admixture with so-called electron-transfer agents (ETA-compounds). Generally, the electron-transfer agent is a compound that is a better silver halide reducing agent under the applied conditions of processing than the electron donor and, in those instances where the electron donor is incapable of, or substantially ineffective in developing the silver halide, the ETA-compound functions to develop the silver halide and provides a corresponding pattern of oxidized electron donor because the oxidized ETA-compound readily accepts electrons from the ED-compound.

The ED-compound is used preferably in non-diffusible state in each silver halide emulsion layer containing an IHR-compound. The ETA-compound on the contrary is preferably used as developing agent in diffusible state. In this way the reactions are better separated in their desired sequence in that first the image-wise oxidation of the ETA-compound by the exposed silver halide starts, then the rapid electron transfer to oxidized ETA-compound from the ED-compound takes place, which ED-compound where unaffected finally reduces the IHR-compound to make it hydrolysable and releasing the PUG-compound in diffusible state. Said dye release from IHR-compounds described in EUR Pat. Appl. No. 0.004 399 is illustrated herein by the following scheme using simplified general formulae:

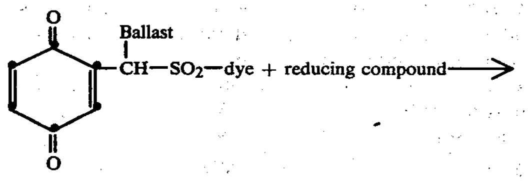

(I)

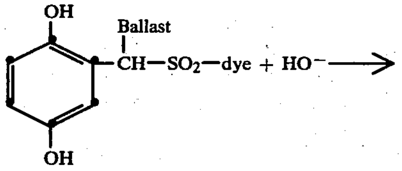

(II)

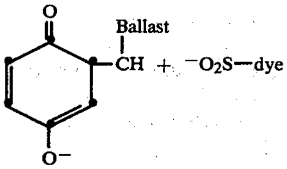

(III) (IV)

In comparison with the IHO-compounds the IHR-compounds offer several advantages the most important is the better controllable PUG-release and the fact that no fog on storage and processing is produced, because the IHR-compounds have no reducing character.

The IHR-PUG release system operating with the ETA (developer) and ED-compound combination as explained above requires all reactions to proceed in the desired order to prevent the release of PUG-compounds in areas wherefrom it may not take place. Such complexity arises partly by the fact that the cleavage requires reduction and hydrolysis. Therefore, if the PUG-release could be controlled by only one parameter, i.e. reduction alone, considerable progress would be made in a correct timing of the diffusion transfer process. This can be realized with so-called CR (Cleavage by Reduction) compounds. These are non-diffusible compounds in which a particular bond can be reductively cleaved thereby releasing a mobile photographically useful group (PUG) e.g. a dye. Such CR compounds are e.g. described in published German Patent Application DE-OS No. 3,008,588 and correspond to the following general formulae (I) or (II):

$$\text{(I)}\ R^1-\overset{\overset{\displaystyle R^2}{|}}{\underset{+}{S}}-\underset{-}{N}-SO_2-R^3 \qquad \text{(II)}\ R^1-S-\overset{\overset{\displaystyle R^4}{|}}{N}-SO_2-R^3$$

wherein:

$R^1$ and $R^2$ (same or different) represent an alkyl, aryl, or heterocyclic group which optionally is substituted, but at least one of $R^1$ or $R^2$ contains a diffusion-hindering alkyl group having up to 22 C-atoms, or $R^1$ and $R^2$ together represent the necessary atoms to complete a heterocyclic ring, $R^3$ represents a photographically useful group, and $R^4$ represents hydrogen or alkyl.

Characteristic for the CR-mechanism is the injection of (one) electron(s) into the bond to be cleaved or electron capture by one of the terminating atoms of the cleavable bond.

In the published European Patent Application No. 0 037 985 non-diffusing reducible compounds are described which under alkaline development conditions release a diffusible photographically useful compound e.g. a diffusible dye suited for use in a photographic silver halide dye diffusion imaging process. The non-diffusing reducible compound corresponds to the following general formula:

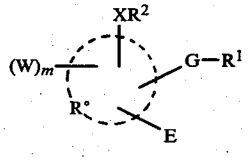

wherein:

$R^0$ is a rest for completing a ring system with at least one aromatic or hetero-aromatic ring;

W is a group which reduces the electron-density in the substituent E;

n is an integer of 1 to 3;

G is a group from which under the photographic development conditions the release of $R^1$ can proceed;

$R^1$ is a rest of a photographically active compound;

X is an oxygen atom, a sulphur atom or an imino group;

$R^2$ is hydrogen or a group which can be released under alkaline conditions;

E is a reducible rest, with the proviso that the reducible compound involved contains at least one diffusion-resistant making residue.

According to the published European Patent Application 0045129 benzyl compounds are provided with nuclear substituents such that a net electron withdrawing effect occurs at the α-carbon atom of the benzyl structure, the α-carbon atom being substituted by a radical which, upon release during a photographic process forms a photographically active antifoggant, toner, spectral sensitizer, dye, colour coupler, silver halide solvent, stabilizer, hardener or accelerator. For example, nitrobenzyl-masked phenyl-mercapto-tetrazole (DMT), incorporated into a silver halide emulsion reacts with developer oxidation products via an electron transfer mechanism to release the potent development restrainer PMT.

It is an object of the present invention to provide a class of chemically readily accessible, reductively cleavable compounds which can be designated as SETIC-compounds (SETIC being the acronym for Single Electron Transfer Induced Cleaving).

It is another object of the present invention to provide a photographic material containing such a SETIC compound for image-wise release and diffusion transfer of a PUG-compound e.g. a dye.

Other objects and advantages will become apparent from the further description.

The SETIC-compounds of the present invention operate through a reductive cleavage mechanism without need for cleavage by hydrolysis. They differ in reaction mechanism from the CR-compounds in that the electron injection occurs in a chemical group or atom not involved in the bond to be cleaved, whereas CR-compounds require electron injection into the bond to be cleaved or electron capture by one of its terminating atoms. One of the advantages of the use of the present SETIC-compounds with respect to said CR-compounds is that they provide a larger variety of diffusible groups by splittable links Z as will be clear from the following.

The SETIC-compounds according to the present invention are capable of being reduced by a silver halide developing agent at a rate slower than that of image-wise developable silver halide in a photographic silver halide material and correspond to the following general formula:

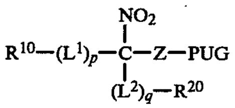

wherein:

each of $R^{10}$ and $R^{20}$ (same or different)

(1) represent an alkyl group e.g. containing up to 22 carbon atoms, a cycloalkyl group, an alkenyl group, a cycloalkenyl group or an aralkyl group e.g. a benzyl group including said groups in substituted form, (2) represent an aryl group including a substituted aryl group, e.g. a phenyl group or (3) represent a heterocyclic ring residue including such residue in substituted form, or $R^{10}$ and $R^{20}$ are ringclosed, either $R^{10}$ or $R^{20}$ containing a ballasting group conferring diffusion resistance to the compound in hydrophilic colloid media when penetrated by an aqueous alkaline liquid;

$L^1$ and $L^2$ (same or different) represent a $-C(=O)-$;

$-SO_2-$; $-NHCO-$; $-NHSO_2-$;

$-O-C(=O)-$;

$-O-SO_2-$ or $-C(=O)-C(=O)-$ group;

p and q (same or different) represent an integer 0 or 1;

Z represents an atom or an atom group which is electronegative with respect to carbon (e.g. $-S-$ or $-SO_2-$), and PUG represents together with Z a releasable photographically useful group e.g. a group containing a chromophoric group.

When used in association with light-sensitive silver halide emulsions of the negative type and reducing substances capable of undergoing single electron removal (such as e.g. hydroquinones and 1-aryl-pyrazolidinones) the SETIC-compound will undergo single electron transfer from unspent reductor left in the unexposed areas according to the following illustrative reaction scheme:

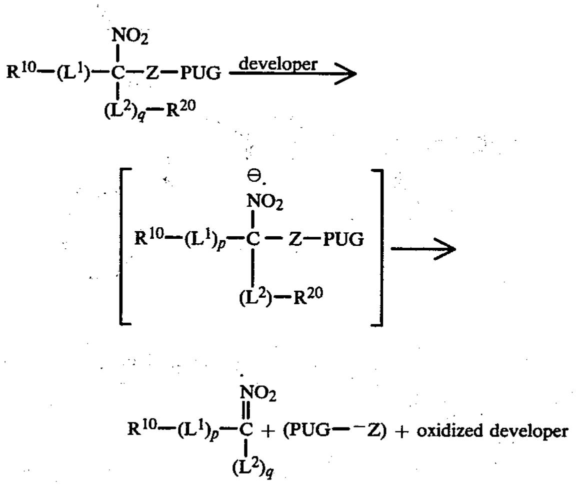

The above SETIC compounds may be sufficiently immobile i.e. resistant to diffusion in an alkali-permeable colloid medium when contacted with an alkaline liquid even when the above mentioned substituents do not contain long alkyl residues, because the molecule may itself be sufficiently large. Normally, however, the SETIC compounds are rendered sufficiently resistant to diffusion by providing them with sufficiently large residues.

Residues which confer diffusion resistance are residues which allow the compounds according to the invention to be incorporated in a diffusion resistant form in the hydrophilic colloids normally used in photographic materials. Organic residues which generally carry straight or branched chain aliphatic groups and which may also carry isocyclic or heterocyclic or aromatic groups and generally having from 8 to 20 carbon atoms are preferably used for this purpose. These residues are attached to the remainder of the molecule either directly or indirectly, e.g. through one of the following groups: $-NHCO-$; $-NHSO_2-$; $-NR-$, in which R represents hydrogen or alkyl; $-O-$, $-S-$; or $-SO_2-$. The residue which confers diffusion resistance may in addition carry groups which confer solubility in water, e.g. sulpho groups or carboxyl groups, and these may also be present in an anionic form. Since the diffusion properties depend on the molecular size of the compound as a whole, it is sufficient in some cases, for example when the molecule as a whole is large enough, to use one or more shorter chain groups as "groups which confer diffusion resistance".

Compounds within the scope of the invention are listed hereinafter in Table 1.

TABLE 1
| Structural formula | |
|---|---|
| 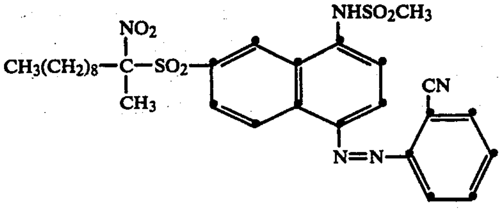 | 1. |
| 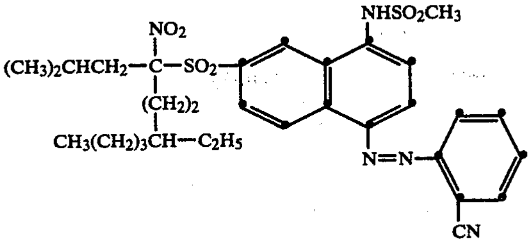 | 2. |
| 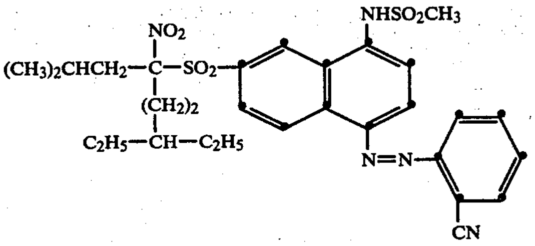 | 3. |
| 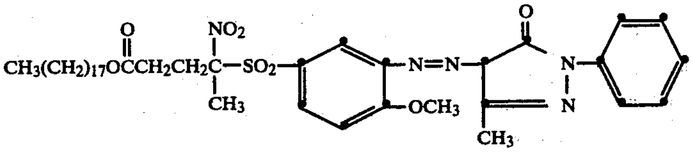 | 4. |
| 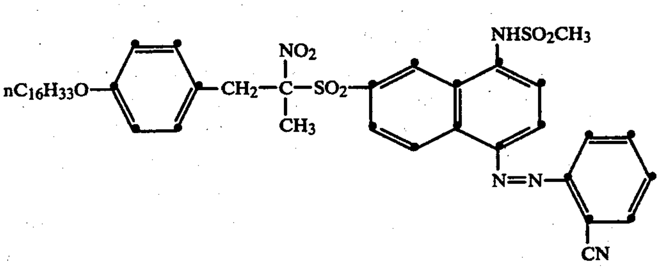 | 5. |
| 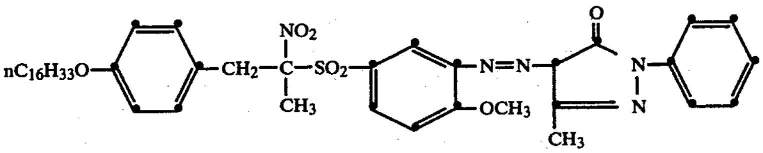 | 6. |
| 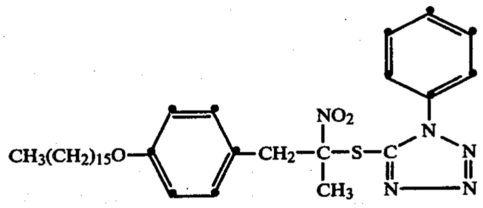 | 7. |

TABLE 1-continued
| Structural formula | |
|---|---|
| 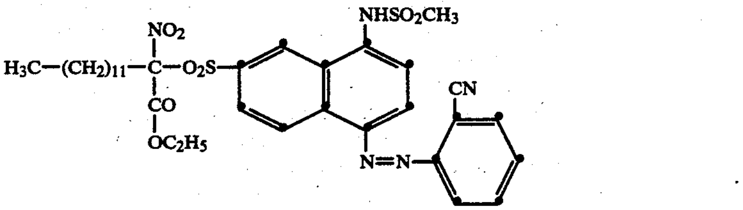 | 8. |
| 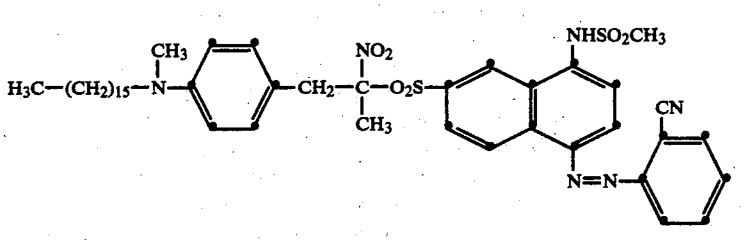 | 9. |
| 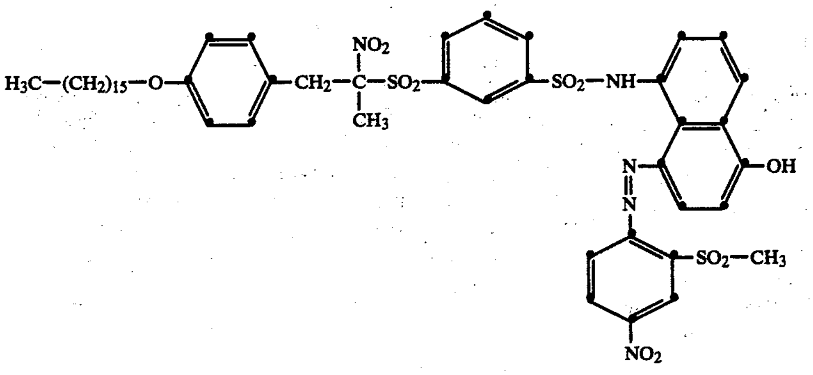 | 10. |
| 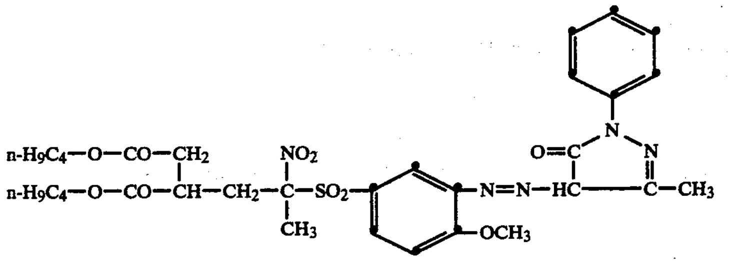 | 11. |
| 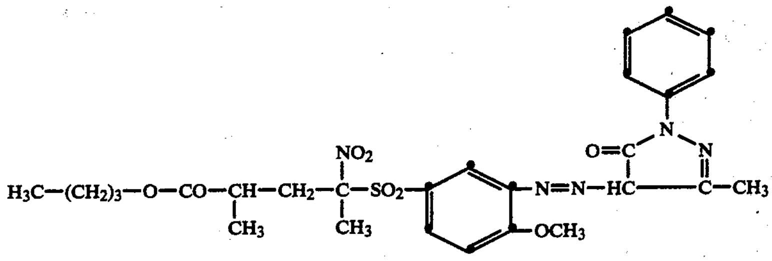 | 12. |
The preparation of these compounds is not particularly complicated and illustrated by the following.
Preparation of compound 1
Reaction sequence:
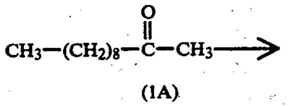
(1A)
-continued
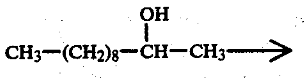
(1B)

-continued

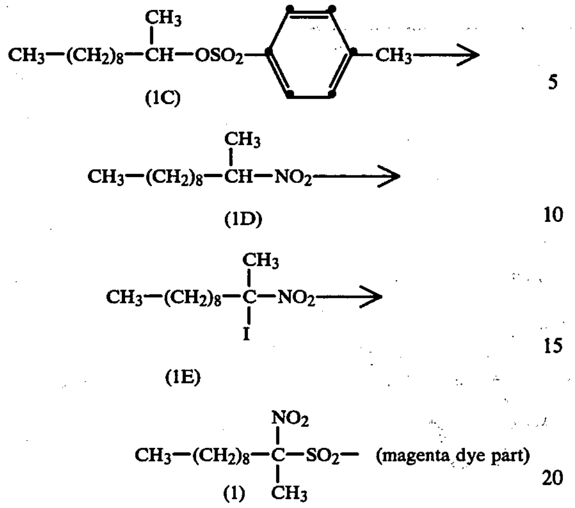

(1C) (1D) (1E) (1)

(a) preparation of compound (1B)

126 g of compound (1A) were mixed with 15 ml of Raney-nickel suspension and anhydrous ethanol up to 50 ml. The reduction proceeded at 80° C. with hydrogen at a pressure of 105 kg per cm2. After 2.5 h the Raney-nickel was removed by filtering. The filtrate was concentrated by evaporation. 119.5 g of oily compound (1B) were obtained.

(b) preparation of compound (1C)

80 g of compound (1B) were dissolved in 700 ml of pyridine at −5° C. 52.5 g of p-tolusulphonylchloride were added portionwise and the mixture was stirred for 5 h at 0° C.

Thereupon the reaction mixture was poured into ice water and acidified with hyrochloric acid. The mixture was extracted with ethyl acetate and the organic phase washed with water, dried and concentrated with a rotary evaporator. Residu: 112 g.

After purification with column chromatography using $CH_2Cl_2$ as eluent 75 g of compound (1C) (structure confirmed by NMR-spectrum) were obtained as a colourless oil.

(c) preparation of compound (1D)

200 ml of dimethyl formamide were used to dissolve at room temperature 13.3 g of urea and 12 g of sodium nitrite. To the solution 32.6 g of compound (1C) were added together with 13.3 g of phloroglucinol (dried at 100° C.). The dissolving of these ingredients lasted 10 min. The reaction mixture was stirred in the dark at room temperature for 30 h. Thereupon the reaction mixture was poured into 500 ml of ice water and 30 ml of benzine. The organic phase was separated and the aqueous phase was extracted 4 times with benzine using portions of 50 ml. The collected benzine fractions were washed 4 times with 50 ml of water saturated with sodium chloride.

The organic phase was concentrated with a rotary evaporator whereby 23 g of compound (1D) was obtained as an oily residue.

Purification by column chromatography yielded 5.3 g of a light-yellow oil of compound (1D) (structure confirmed by NMR-spectrum).

(d) preparation of compound (1E)

To a solution of 0.5 g of sodium in 20 ml of methanol 4 g of compound (1D) were added.

Thereupon the solvent was removed with a rotary evaporator whereby a white solid residue was obtained. This residue was dissolved in 60 ml of water; the solution was cooled down to 0° C. and 5 g of iodine dissolved in 50 ml of diethyl ether was added portionwise up to the maintaining of a brown colour. The reaction mixture was stirred for 30 min. The organic phase was separated and the aqueous phase was washed twice with 50 ml of diethyl ether. The collected ether fractions were washed with water, dried and the solvent removed with a rotary evaporator.

6.2 g of a red oil was obtained which by thin-layer-chromatography proved to be practically pure compound (1E).

(e) preparation of compound 1

6 g of compound (1E) and 8.6 g of 1-methylsulphonylamino-4-(2-cyano-phenylazo) sulphinic acid naphthalene sodium salt (prepared starting from compound No. Vb described in published European Patent Application No. 00 38 092) were mixed at room temperature while stirring with 50 ml of dimethyl formamide. Stirring was continued for 16 h.

Thereupon 350 ml of $CH_2Cl_2$ were added to the reaction mixture and the precipitate of sodium salt was removed by suction filtering. The filtrate was treated three times with water to extract residual sodium salt. The organic phase was dried and the solvent removed by evaporation in a rotary evaporator. The crude compound 1 was purified by column chromatography using a mixture of methylene chloride/ethyl acetate (95/5 by volume) as eluent. Melting point: 85° C. (unsharp). Yield: 1.8 g.

Preparation of compound 4

Reaction sequence:

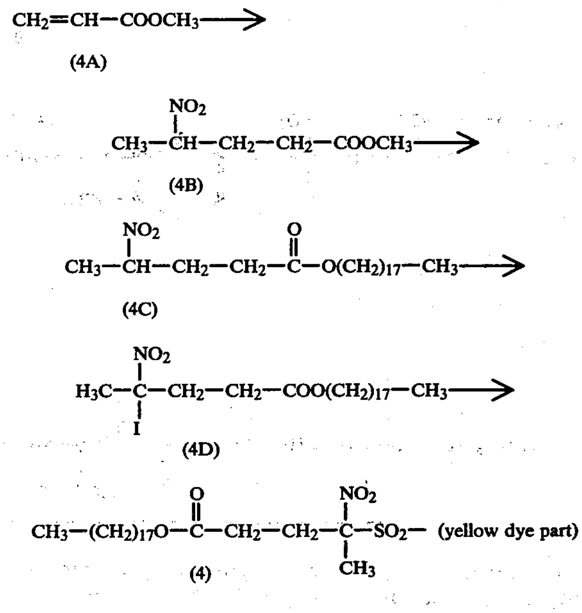

(4A) (4B) (4C) (4D) (4)

(a) preparation of compound (4B)

To a mixture of 64.5 g of methyl acrylate (compound 4A) and 175 ml of nitroethane were added dropwise at 10° C. 15 g of tetramethyl guanidine, the temperature being not allowed to rise above 40° C. The reaction mixture was kept overnight. Methylene chloride was added and the organic phase treated 3 times with 1 N hydrochloric acid. Thereupon the organic phase was washed till being free of acid and the solvent removed with a rotary evaporator.

The residue was distilled at 0.8 mm mercury pressure. The fraction boiling at 85°–90° C. was collected.

Yield: 55.7 g of a colourless oil (structure of compound 4B confirmed by NMR spectrum).

(b) preparation of compound (4C)

To 18.5 g of compound (4B) and 27 g of 1-octadecanol 4 drops of concentrated sulphuric acid were added. The reaction mixture was heated on an oil bath at 100° C. and kept for 3 h under reduced pressure with a water-jet pump. Ethyl acetate was added to the cooled reaction mixture and washed with water to remove the acid. The ethyl acetate was evaporated and 30.8 g of oily residue obtained. Purification proceeded by column chromatography using a mixture of methylene chloride/n-hexane (1/1 by volume) as eluent, and yielded 23.7 g, with a melting point below 50° C.

The structure of compound (4C) was confirmed by the NMR spectrum.

(c) preparation of compound (4D)

8 g of compound (4C) in powder form and 5.6 g of potassium carbonate were added to 100 ml of methanol and stirring was continued up to complete dissolution of compound (4D). The precipitate was removed by suction filtering and washed with methanol. The filtrate was concentrated with a rotary evaporator. The residue was treated with 50 ml of diethyl ether and 50 ml of water. To said mixture 5 g of iodine dissolved in 50 ml of diethyl ether were added portionwise up to the maintaining of a brown colour. Stirring was continued for 1 h. The organic phase was separated and washed 3 times with water, dried and concentrated with rotary evaporator.

6 g of crude product (4D) containing a minor amount of octadecanol were obtained.

(d) preparation of compound 4

6 g of said crude product (4D) and 4 g of the sulphinic acid sodium salt derived from 1-phenyl-3-methyl-4(2-methoxy-5-chlorosulphonylphenylazo)-pyrazoline-(5) described in published European patent publication No. 0.004.399 were dissolved in 60 ml of dimethyl formamide and kept for 48 h at room temperature. The formed precipitate was removed by suction filtering and methylene chloride added. The organic phase was treated thrice with water, dried and concentrated by evaporation of the solvent with rotary evaporator. Yield: 5 g of yellow powder.

Purification proceeded by column chromatography using a mixture of methylene chloride/ethyl acetate (98/2 by volume) as eluent. Melting point: 194° C.

Preparation of compound 7

Reaction sequence

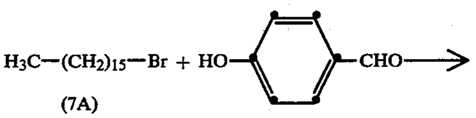

(7A)

(7B)

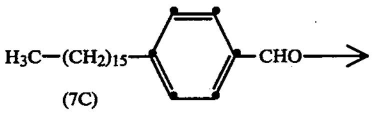

(7C)

-continued

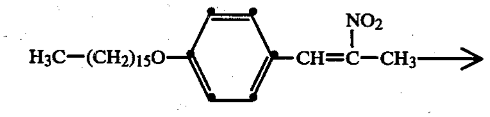

(7D)

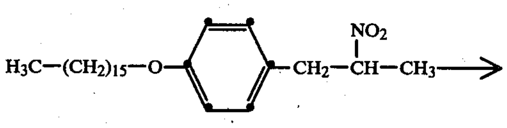

(7E)

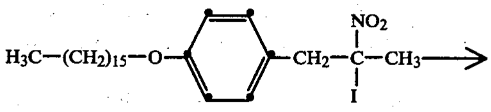

(7F)

compound 7

(a) preparation of compound (7C)

73 g of p-hydroxybenzaldehyde, 192 g of n-hexadecylbromide and 33.6 g of potassium hydroxide were dissolved in 600 ml of ethylene glycol monomethyl ether and boiled with reflux for 2 h. The formed precipitate of potassium bromide was removed by suction filtering, the filtrate cooled and poured into 2 l of water. The obtained precipitate was separated by suction filtering washed with water and dried. Yield: 145 g.

By recrystallization from methanol 85 g of compound (7C) melting at 41°–42° C. was obtained.

(b) preparation of compound (7D)

50 g of compound (7C), 22 ml of nitroethane, 10 g of ammonium acetate and 100 ml of acetic acid were boiled with reflux for 4 h. Upon cooling the reaction mixture to 15° C. ice was added till the precipitation of a solid product. The precipitate was separated by suction filtering, washed with water to remove the acid and dried. Yield: 50 g. Purification proceeded by column chromatography using a mixture of methylene chloride and n-hexane (1/1 by volume). Melting point: 65° C.

(c) preparation of compound (7E)

20 g of compound (7D) were dissolved at 40° C. in 180 ml of ethylene glycol monomethyl ether.

2 g of $NaBH_4$ (solid) were added in small portions taking care to maintain the temperature at 40° C. Stirring was continued up to the appearance of a white colour. The reaction mixture was poured into 500 ml of water and brought at a pH of 2 with sulphuric acid while the stirring at room temperature was continued for 1 h.

The formed precipitate was separated by suction filtering washed with water to remove any acid and dried. Yield: 22.2 g.

The product was purified by column chromatography using a mixture of methylene chloride and n-hexane (1/1 by volume) as eluent. Yield: 17 g. Melting point: 62° C.

(d) preparation of compound (7F)

10 g of compound (7E) were put into 250 ml of methanol and stirred together with 2.5 g of sodium methylate. The ingredients were dissolved completely by adding 250 ml of diethyl ether. Thereupon the solvents were removed by evaporation with rotary evaporator. To the residue 100 ml of water and a solution of 6.25 g iodine in 250 ml of ether were added portionwise till the maintaining of a brown colour. Stirring was continued for 1 h. The water was removed and the organic phase was washed three times with water, dried and concentrated by evaporation.

The product was purified by column chromatography using a mixture of methylene chloride and n-hexane (30/70 by volume) as eluent. Yield: 8 g. Melting point: 54° C.

(e) preparation of compound 7

8 g of compound (7F) were dissolved in 80 ml of dimethyl formamide and 3.2 g of 1-phenyl-5-mercapto-tetrazole sodium salt added thereto. The reaction mixture was kept at room temperature for 48 h. Thereupon methylene chloride and water were added thereto and the mixture shaked. The organic phase was separated, washed with water and dried. After removal of the solvent by evaporation with a rotary evaporator 10 g of crude compound 7 were obtained. Purification proceeded by column chromatography using methylene chloride or eluent.

Yield: 4 g. Melting point: 59° C.

Preparation of compound 8

Reaction sequence

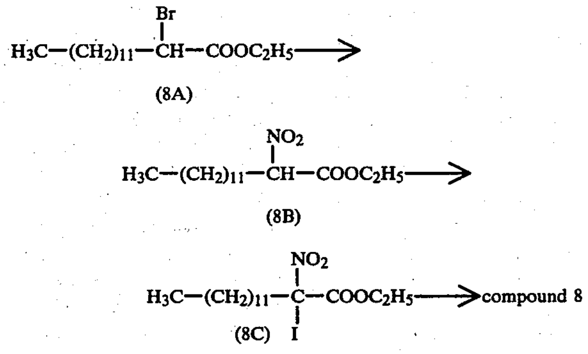

(a) preparation of compound (8B)

In 200 ml of dimethylformamide first 13.3 g of urea and subsequently 12 g of sodium nitrite were dissolved. To the solution 33.5 g of compound (8A) were added and subsequently 13.3 g of anhydrous phloroglucinol. By cooling in a water bath the temperature was kept at 20° C. The reaction mixture turned brown. After 6 h standing at room temperature to the reaction mixture 500 ml of water were added and the liquid mass was extracted three times with methylene chloride. The collected extracted portions were washed with water, dried and concentrated by evaporation. Yield: 32.6 g of a dark-brown oil.

Purification proceeded by column chromatography and yielded 12 g of the oily product (8B).

(b) preparation of compound (8C)

4 g of anhydrous potassium carbonate were added to 6 g of compound (8B) in 60 ml of methanol. The reaction mixture was stirred for 1 h at 20° C. The precipitate formed was separated by suction filtering, and washed with methanol. The filtrate was concentrated with a rotary evaporator and to the concentrate 60 ml of water were added and cooled down to 0° C. 5 g of iodine dissolved in 50 ml of diethyl ether were added in small portions till the maintaining of a brown colour. The reaction mixture was kept for 30 min at 20° C. and was shaked from time to time.

The ether phase was separated, washed with water, dried and concentrated. Yield: 6.3 g. Purification by column chromatography yielded 3.4 g of compound (8C).

(c) preparation of compound 8

3.4 g of compound (8C) and 4 g of 1-methylsulphonylamino-4-(2-cyano-phenylazo) sulphinic acid naphthalene sodium salt (used in preparation (1e) above) were mixed with 25 ml of dimethylformamide and kept for 48 h at 20° C.

Thereupon 150 ml of $CH_2Cl_2$ were added and the precipitate of sodium salt was removed by suction filtering. The filtrate was shaked three times with water and the organic phase finally dried and concentrated by evaporation. Purification by column chromatography as described for compound 1 yielded 0.15 g of pure compound 8.

The SETIC-compounds according to the present invention are capable of reacting in an exposed and developed photographic silver halide recording material with residual imagewise available ED-compound by reductive cleavage of the ballast group carrying part of the SETIC-compound which part is also called the carrier part hereby releasing the diffusible part being the —Z-PUG-group. The mobile molecule part which for direct colour image formation by diffusion is a dye, is transferred by diffusion into an image-receiving layer forming therein a colour image. In the area free from residual ED-compound i.e. where silver halide has been developed such PUG-compound release can not take place. When the ED-compound acts as silver halide developer direct reduction of the SETIC-compound takes place. When the ED-compound has not the capability to act as photographic silver halide developer a system of common photographic developer acting as electron transfer agent (ETA-compound) and ED-compound is used so that oxidized developer reacts first with ED-compound before it has the occasion to react with the SETIC-compound. By such reaction system using negative working silver halide emulsion layer materials image reversal by diffusion transfer of released PUG-compound from the unexposed areas takes place.

By the combination of the present SETIC-compounds with a proper system of ED-compounds or ED-precursor compounds and photographic developing agents a sequence of reactions can be obtained which results in an optimum speed of dye release with high optical densities and very low fog formation.

A photographic material according to the present invention comprises in its simplest form a support carrying at least one unexposed alkali-permeable silver halide hydrophilic colloid emulsion layer which contains in operative contact therewith or therein a said SETIC compound that is immobile in an alkali-permeable colloid medium when contacted with an alkaline liquid and that contains a photographically useful group, said SETIC compound being capable of being reduced by a silver halide developing agent at a rate slower than that of image-wise developable silver halide in the photographic material and in reduced state being capable of releasing said photographically useful group.

The SETIC compounds for use according to the invention are incorporated in the coating liquid for the layers of a photographic material by one of the usual methods. The quantity of such compound used per liter of coating liquid varies within relatively wide limits e.g. dependent on the photographically useful group that is to be split off and the most suitable concentration can be found with the aid of simple tests. For example, from 0.01 to 10 g, preferably from 0.1 to 0.5 g, of SETIC compound may be used per sq.m. The incorporation into the coating liquid e.g. the silver halide emulsion may proceed, from a dispersion prepared in a sand-mill or by using ultrasound.

According to another method, it may be desired to incorporate the SETIC compounds in a hydrophilic colloid layer in the form of so-called micro-capsules together with silver halide and optionally also developer substances. In that case, two or more differently sensitized light-sensitive silver halide emulsions and the appropriate diffusion resistant compounds may be combined in a single layer in the form of so-called mixed grain emulsions, for example as described in U.S. Pat. No. 2,698,794 of Leopold Godowsky, issued Jan. 4, 1955. Methods of incorporation in which a SETIC compound is incorporated into a hydrophilic binder from an alkaline aqueous solution may be applied too since there is no danger of hydrolysis of the compound.

According to a preferred embodiment the photographic material contains (a) negative-working silver halide emulsion layer(s) and is capable of providing with said negative-working silver halide emulsion layer(s) positive colour images by using therein said SETIC compounds that in reduced state are capable of directly releasing a dye, a dye precursor or a colour coupler.

In a particular embodiment said SETIC compound is present in a hydrophilic colloid layer adjacent to a silver halide emulsion layer, this adjacent layer being preferably situated behind, viewed in the direction of incident light during exposure, the silver halide emulsion layer.

In an embodiment for producing multicolour images this invention relates to photographic materials that comprise a support carrying (1) a red-sensitive silver halide emulsion layer having operatively associated therewith a said SETIC compound that is initially immobile in an alkali-permeable colloid medium and wherefrom through the reducing action of a silver halide developing agent and alkalinity a cyan dye is split off in diffusible state, (2) a green-sensitive silver halide emulsion layer having operatively associated therewith said compound of (1) with the difference that a magenta dye is split off in diffusible state, and (3) a blue-sensitive silver halide emulsion layer having operatively associated therewith said compound of (1) with the difference that a yellow dye is split off in diffusible state.

The image dye-providing moiety may be a preformed dye or a shifted dye. Dye materials of this type are well-known in the art and include azo dyes, azomethine (imine) dyes, anthraquinone dyes, alizarine dyes, merocyanine dyes, quinoline dyes, cyanine dyes and the like. The shifted dyes include those compounds whose light-absorption characteristics are shifted hypsochromically or bathochromically when subjected to a different environment such as a change in pH, a reaction with a material to form a complex, a tautomerization, reactions to change the pKa of the compound, a removal of a group such as a hydrolysable acyl group connected to an atom of the chromophore as mentioned by Weyerts, U.S. Pat. No. 3,260,597 of Stanley R. Scales and Allen E. Wisler, issued July 12, 1966, and the like. In certain embodiments, the shifted dyes are highly preferred, especially those containing a hydrolyzable group on an atom affecting the chromophore resonance structure, since the compounds can be incorporated directly in a silver halide emulsion layer or even on the exposure side thereof without substantial reduction in the light that is effective in the exposure of the silver halide. After exposure, the dye can be shifted to the appropriate colour such as, e.g., by hydrolytic removal of an acyl group to provide the respective image dye.

In another embodiment the compounds of this invention contain an image dye-providing moiety, which is an image-dye precursor. The term "image-dye precursor" is understood to refer to those compounds that undergo reactions encountered in a photographic imaging system to produce an image dye such as colour couplers, oxichromic compounds, and the like.

When colour couplers are used, they can be released in areas where no development occurs and can diffuse to an adjacent layer where they can be made to react with an oxidized colour developer such as an oxidized primary aromatic amine to form the image dye. Generally, the colour coupler and the colour developer are chosen so that the reaction product is immobile. Typical useful colour couplers include the pyrazolone couplers, pyrazolotriazole couplers, open-chain ketomethylene couplers, phenolic couplers and the like. Further reference to the description of appropriate couplers is found in U.S. Pat. No. 3,620,747 of John C. Marchant and Robert F. Motter, issued Nov. 16, 1971, which is incorporated herein by reference.

The compounds containing oxichromic moieties can be advantageously used in a photographic system since they are generally colourless materials due to the absence of an image-dye chromophore. Thus, they can be used directly in the photographic emulsion or on the exposure side thereof without competitive absorption. Compounds of this type are those compounds that undergo chromogenic oxidation to form the respective image dye. The oxidation can be carried out by aerial oxidation, incorporation of oxidants into the photographic element or film unit, or use of an oxidant during processing. Compounds of this type have been referred to in the art as leuco compounds, i.e., compounds that have no colour. Typical useful oxichromic compounds include leuco indoanilines, leuco indophenols, leuco anthraquinones and the like.

Compounds according to the present general formulae have particular application in a diffusion transfer process where it is desired to have a dye or dye precursor entity transferred to an adjacent layer or a receiving element. However, in certain embodiments this invention relates to the release of an image-wise distribution of a diffusible photographically useful compound, which is not a dye or dye precursor but a photographic reagent. Typical useful photographic reagents are known in the art, such as in U.S. Pat. No. 3,227,551 of Charles R. Barr, John Williams and Keith Whitmore, issued Jan. 4, 1966; 3,364,022 of Charles R. Barr, issued Jan. 16, 1968; 3,379,529 of Ralph Frederik Porter, Judith A. Schwan and John W. Gates, issued Apr. 23, 1968 and 3,698,898 of J. Michael Grasshoff and Lloyd D. Taylor, issued Oct. 17, 1972, e.g. a silver-complexing agent acting as a silver halide solvent, a fixing agent, a toning agent, a hardener, an antifogging agent, a sensitizer, a desensitizer, a developer, an oxidizing agent, a developing inhibitor or restrainer, the Z group being —S— when splitting off mercapto compounds or a thiosulphate. Such is not possible with the above defined CR-compounds.

The silver halide development inhibitor includes e.g. triazoles and tetrazoles such as a 5-mercapto-1-phenyltetrazole, a 5-methylbenzotriazole, a 4,5-dichlorobenzotriazole and the like. The antifoggant includes besides these mercapto compounds e.g. azaindenes such as a tetrazaindene and the like. The compounds that contain releasable silver halide development inhibitors or antifoggants can generally be used in the photographic elements in association with silver halide layers dissolved in a coupler solvent such as diethyl lauramide. When these compounds are incorporated in photographic elements in association with negative silver halide emulsions, a positive image-wise distribution of inhibitor or antifoggant will be produced upon development. Thus, silver development is inhibited or restrained in the low-exposure toe as seen on the H and D curve, but not in the more fully exposed shoulder as also appears from that curve. Development inhibition of the exposed areas is achieved thereby selectively. When the silver halide emulsions also have dye releasers in accordance with this invention associated therewith, the overall effect of the inhibitor or antifoggant is to release more dye in the unexposed regions, improving maximum image-dye density in the image-receiving layer without increasing the amount of dye released in the exposed regions.

In a specific embodiment in accordance with this invention a photographic material being a film unit is provided that is adapted to be processed by passing said unit between a pair of juxtaposed pressure-applying members, such as would be found in a camera designed for in-camera processing. The unit comprises (1) a photosensitive element, which contains a silver halide emulsion layer having associated therewith a said SETIC compound that is initially immobile in an alkali-permeable colloid medium and wherefrom through the reducing action of a silver halide developing agent and alkalinity a dye is split off in diffusible state, (2) an image dye-receiving layer, (3) means for discharging an alkaline processing composition within the film unit such as a rupturable container, which is adapted to be positioned during processing of the film so that a compressive force applied to the container by the pressure-applying members will effect a discharge of the container's contents within the film, and (4) a silver halide developing agent, which is soluble in the alkaline processing composition located within said film unit.

The photographic material of the present invention is useful in a new process comprising (1) applying an alkaline processing composition to the image-wise exposed photographic material comprising a support carrying at least one silver halide emulsion layer and at least one alkali-permeable layer (which may be the same layer as the one containing the silver halide) comprising said SETIC compound that is initially immobile in an alkaline-permeable colloid medium, wherein said compound is capable of being reduced by a silver halide developing agent at a rate slower than that of image-wise developable silver halide in the material and in reduced state is capable under alkaline conditions of releasing a photographically useful group, (2) providing said developing agent for said photographic material during application of said alkaline processing composition under conditions to effect image-wise release of said photographically useful group inversely proportionally to the image-wise development of said silver halide in the photographic material, and (3) allowing the diffusion with said alkaline processing composition of the photographically useful group out of the layer in which it was originally incorporated to have it introduced image-wise in another layer.

In an embodiment for producing dye images, this invention relates to a photographic colour diffusion transfer process comprising:

(a) treating a photographic element in accordance with this invention with an alkaline processing composition in the presence of a silver halide developing agent to effect development of each of the exposed silver halide emulsion layers, thereby image-wise oxidizing the developing agent and as an inverse function of image-wise silver halide development reducing said immobile SETIC compound(s) that in reduced state are capable of releasing (a) dye(s);

(b) maintaining said photographic material in the alkaline medium of the processing composition for a time sufficient to release said dye(s) in diffusible state from the reduced immobile compound(s); and (c) transferring at least a portion of said dye(s) to a non-light-sensitive layer acting as a receptor layer.

For in-camera processing the photosensitive material is preferably composed such that the photosensitive silver halide emulsion layer(s) is (are) negative-working and applied to the same support as the receptor layer so as to form an integral combination of light-sensitive layer(s) and a non light-sensitive layer receiver element preferably with an opaque layer, which is alkali-permeable, reflective to light and located between the receptor layer and the silver halide emulsion layer(s). In a process using such material the alkaline processing composition may be applied between the outer photosensitive layer of the photographic element and a cover sheet, which may be transparent and superposed before exposure.

In a modified embodiment, the dye-releasing compound can be incorporated into an alkali-permeable binder of a layer coated on a support other than the support of the silver halide emulsion layer(s) forming a receptor material separate from the light-sensitive material. Said receptor material can be processed by positioning it in interfacial contact with an image-wise exposed photographic silver halide material in the presence of an alkaline solution and a silver halide developing agent. In those areas where unoxidized silver halide developing agent reduces the initially immobile SETIC compound capable of releasing a dye a pattern of diffusible dye is formed. The diffusible dye is thereupon washed away leaving a pattern of immobile dye in the recording material. Likewise, if the initially immobile compound contains a tanning agent as the photographically useful moiety, it is possible to obtain a tanned image record in a receptor material in areas corresponding with those of the light-sensitive material where silver halide development does not take place, i.e. a positive tanned image record if a negative-working emulsion is used.

The photographic silver halide materials according to the present invention can be processed in the presence of (a) silver halide developing agent(s) that has (have) sufficient reducing power for single electron injection into the present SETIC compounds.

Photographic silver halide developing agents suitable for that purpose can be found by simple tests using them in combination with an elected set of silver halide and the defined immobile reducible SETIC compounds that in reduced state can release a photographically useful group.

It is preferred to carry out the colour diffusion transfer process with the present SETIC compounds in conjunction with a mixture of reducing agents at least one of which is a compound called electron donor (ED-compound) and at least one of which is a compound called electron-transfer agent (ETA-compound).

The ED-compounds are preferably non-diffusing e.g. provided with a ballasting group so that they remain within the layer unit wherein they have to transfer their electrons to the PUG-providing compound.

The ED-compound is preferably present in non-diffusible state in each negative working silver halide emulsion layer containing a different non-diffusible dye or dye precursor. Examples of such ED-compound are ascorbyl palmitate and 2,5-bis(1',1',3',3'-tetramethylbutyl)-hydroquinone. Other ED-compounds are disclosed in U.S. Pat. No. 4,139,379 and in published German Patent Application No. 2 947 425. Instead of an ED-compound an electron-donor precursor compound can be used in the photographic material as described e.g. in published German Patent Application No. 2 809 716 and in U.S. Pat. No. 4,278,750. Particularly useful ED-precursor compounds for combination with the present SETIC compounds are benzofuran derivatives disclosed in published German Patent Application No. 3 006 268 and correspond to the following general formula:

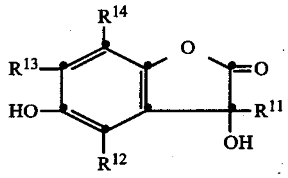

wherein:

$R^{11}$ represents a carbocyclic or heterocyclic aromatic ring, $R^{12}$, $R^{13}$ and $R^{14}$ (same or different) represent hydrogen, alkyl, alkenyl, aryl, alkoxy, alkylthio, amino, or $R^{13}$ and $R^{14}$ represent together an adjacent ring e.g. carboxyclic ring, and wherein at least one of $R^{11}$, $R^{12}$, $R^{13}$ and $R^{14}$ represent a ballast group having from 10–22 carbon atoms.

The ETA-compound is preferably used as developing agent in diffusible state and is, e.g., incorporated in mobile form in (a) hydrophilic colloid layer(s) adjacent to one or more silver halide emulsion layers or applied from the processing liquid for the dye diffusion transfer.

Typically useful ETA-compounds include hydroquinone compounds, aminophenol compounds, catechol compounds, phenylene diamines and 3-pyrazolidinone compounds e.g. 1-aryl-3-pyrazolidinone as defined e.g. in U.S. Pat. No. 4,139,379.

A combination of different ETA's such as those disclosed in U.S. Pat. No. 3,039,869 can also be employed. Such developing agents can be employed in the liquid processing composition or may be contained, at least in part, in any layer or layers of the photographic element or film unit such as the silver halide emulsion layers, the dye image-providing material layers, interlayers, image-receiving layer, etc. The particular ETA selected will, of course, depend on the particular electron donor and SETIC compound used in the process and the processing conditions for the particular photographic element.

The concentration of ED-compound or ED-precursor compound in the photographic material may vary within a broad range but is, e.g., in the molar range of 1:1 to 8:1 with respect to the SETIC compound. The ETA-compound may be present in the alkaline aqueous liquid used in the development step, but is used preferably in diffusible form in a non-sensitive hydrophilic colloid layer adjacent to at least one silver halide emulsion layer.

Migration of non-oxidized developing agent, e.g. acting as ETA-compound, proceeds non-image-wise and will have an adverse effect on correct colour rendering when surplus developing agent remains unoxidized in the photoexposed area of a negative working emulsion layer. Therefore, according to a preferred embodiment of the present invention a silver halide solvent e.g. thiosulphate is used to mobilize unexposed silver halide in complexed form for helping to neutralize (i.e. oxidize by physical development) migrated developing agent in the photoexposed area wherein unaffected developing agent (ETA-compound) should no longer be available for reacting with the SETIC compound directly or through the applied ED-compound. The use of silver halide solvents for that purpose has been described in European Patent Application No. 81 200788.8.

In order to obtain a more correct colour rendition it is also advantageous to intercept oxidized ETA-compound and to prevent it from migrating to adjacent imaging layers where it could cause the undesired oxidation of ED-compound. For said interception so-called scavengers are used that are incorporated in the photographic material in non-diffusible state e.g. in interlayers between the imaging layers. Suitable scavengers for that purpose are described e.g. in U.S. Pat. No. 4,205,987 and European Pat. No. 29546.

In a photographic element according to the invention and containing two or more silver halide emulsion layers, each silver halide emulsion layer containing a dye image-providing material or having the dye image-providing material present in a contiguous layer may be separated from the other silver halide emulsion layer(s) in the film unit by (an) interlayer(s), including e.g. gelatin, calcium alginate, or any of the colloids disclosed in U.S. Pat. No. 3,384,483 of Richard W. Becker, issued May 21, 1968, polymeric materials such as polyvinylamides as disclosed in U.S. Pat. No. 3,421,892 of Lloyd D. Taylor, issued Jan. 14, 1969, or any of those disclosed in French Patent Specification No. 2,028,236 filed Jan. 13, 1970 by Polaroid Corporation or U.S. Pat. Nos. 2,992,104 of Howard C. Haas, issued July 11, 1961 and 3,427,158 of David P. Carlson and Jerome L. Reid, issued Feb. 11, 1969.

According to an embodiment in the preparation of a multicolour diffusion transfer material according to the present invention, a water-permeable colloid interlayer dyed with a yellow non-diffusing dye or Carey Lea silver is applied below the blue-sensitive silver halide emulsion layer containing a yellow dye-releasing compound.

In certain embodiments of the invention and especially with integral format film units, an opacifying agent can be applied from a processing composition. Examples of opacifying agents include carbon black, barium sulphate, zinc oxide, barium stearate, silicates, alumina, zirconium oxide, zirconium acetyl acetate, sodium zirconium sulphate, kaolin, mica, titanium dioxide, organic dyes such as indicator dyes, nigrosines, or mixtures thereof in widely varying amounts depending upon the degree of opacity desired. In general, the concentration of opacifying agent should be sufficient to prevent further exposure of the silver halide emulsion or emulsions of the film unit by ambient actinic radiation through the layer of processing composition, either by direct exposure through a support or by light piping from the edge of the element. For example, carbon black or titanium dioxide will generally provide sufficient opacity when they are present in the processing solution in an amount of from about 5 to 40% by weight. After the processing solution and opacifying agent have been distributed into the film unit, processing may take place out of the camera in the presence of actinic radiation in view of the fact that the silver halide emulsion(s) of the laminate is (are) appropriately protected against incident radiation, at one major surface by the opaque processing composition and at the remaining major surface by the opaque layer that is permeable to alkaline solutions. In certain embodiments, ballasted indicator dyes or dye precursors can be incorporated in a layer on the exposure side of the photosensitive layers; the indicator dye is preferably transparent during exposure and becomes opaque when contacted with the processing composition. Opaque binding tapes can also be used to prevent edge leakage of actinic radiation incident on the silver halide emulsion.

When titanium dioxide or other white pigments are employed as the opacifying agent in the processing composition, it may also be desirable to employ in cooperative relationship therewith a pH-sensitive opacifying dye such as a phthalein dye. Such dyes are light-absorbing or coloured at the pH at which image formation is effected and colourless or not light-absorbing at a lower pH. Other details concerning these opacifying dyes are described in French Patent Specification No. 2,026,927 filed Dec. 22, 1969 by Polaroid Corporation.

The substantially opaque, light-reflective layer, which is permeable to alkaline solutions, in the integral receiver film units of the present invention can generally comprise any opacifier dispersed in a binder as long as it has the desired properties. Particularly desirable are white light-reflective layers since they present esthetically pleasing backgrounds on which to view a transferred dye image and also possess the optical properties desired for reflection of incident radiation. Suitable opacifying agents include, as already mentioned with respect to the processing composition, titanium dioxide, barium sulphate, zinc oxide, barium stearate, silver flake, silicates, alumina, zirconium oxide, zirconium acetyl acetate, sodium zirconium sulphate, kaolin, mica, or mixtures thereof in widely varying amounts depending upon the degree of opacity desired. The opacifying agents may be dispersed in any binder such as an alkaline solution-permeable polymeric matrix such as, for example, gelatin, polyvinyl alcohol, and the like. Brightening agents such as the stilbenes, coumarins, triazines and oxazoles may also be added to the light-reflective layer, if desired. When it is desired to increase the opacifying capacity of the light-reflective layer, dark-coloured opacifying agents may be added to it, e.g., carbon black, nigrosine dyes, etc. Another technique to increase the opacifying capacity of the light-reflective layer is to employ a separate opaque layer underneath it comprising, e.g., carbon black, nigrosine dyes, etc., dispersed in a polymeric matrix that is permeable to alkaline solutions such as, e.g., gelatin, polyvinyl alcohol, and the like. Such an opaque layer would generally have a density of at least 4 and preferably greater than 7 and would be substantially opaque to actinic radiation. The opaque layer may also be combined with a developer scavenger layer if one is present. The light-reflective and opaque layers are generally 0.025 to 0.15 mm in thickness, although they can be varied depending upon the opacifying agent employed, the degree of opacity desired, etc.

The photosensitive substances used in this invention are preferably silver halide compositions and may comprise silver chloride, silver bromide, silver bromoiodide, silver chlorobromoiodide and the like, or mixtures thereof. The emulsions may be coarse- or fine-grain and can be prepared by any of the well-known procedures, e.g., single-jet emulsions, double-jet emulsions, such as Lippmann emulsions, ammoniacal emulsions, thiocyanate- or thioether-ripened emulsions such as those described in U.S. Pat. Nos. 2,222,264 of Adolph H. Nietz and Frederick J. Russell, issued Nov. 19, 1940, 3,320,069 of Bernard D. Illingsworth, Issued May 16, 1967, and 3,271,157 of Clarence E. McBride, issued Sept. 6, 1966. Surface-image emulsions may be used or internal-image emulsions may be used such as those described in U.S. Pat. Nos. 2,592,250 of Edward Philip Davey and Edward Bowes Knott, issued Apr. 8, 1952, 3,206,313 of Henry D. Porter, Thomas H. James and Wesley G. Lowe, issued Sept. 14, 1965, and 3,447,927 of Robert E. Bacon and Jean F. Barbier, issued June 3, 1969. The emulsions may be regular-grain emulsions such as the type described by Klein and Moisar in J.Photogr.Sci., Vol. 12, No. 5, Sept./Oct., 1964, pp. 242–251. If desired, mixtures of surface- and internal-image emulsions may be used as described in U.S. Pat. No. 2,996,382 of George W. Luckey and John C. Hoppe, issued Aug. 15, 1961.

Negative-type are normally used and when no image reversal is required likewise direct-positive emulsions may be used such as those described in U.S. Pat. Nos. 2,184,013 of John A. Leermakers, issued Dec. 19, 1939, 2,541,472 of William B. Kendall and George D. Hill, issued Feb. 13, 1951, 3,367,778 of Robert W. Berriman, issued Feb. 6, 1968, 3,501,307 of Bernard D. Illingsworth, issued Mar. 17, 1970, 2,563,785 of Charles F. Ives, issued Aug. 7, 1951, 2,456,953 of Edward Bowes Knot and Guy William Willis, issued Dec. 21, 1948, 2,861,885 of Edwin H. Land, issued Nov. 25, 1958, 3,761,276 of Francis John Evans, issued Sept. 25, 1973, 3,761,266 of Kirby Mitchell Milton, issued Sept. 25, 1973, 3,736,140 Susan Starr Collier and Paul Brewster Gilman Jr., issued May 29, 1973, and 3,730,723 of Paul Brewster Gilman Jr., Ronald George Raleigh and Thaddeus Donald Koszelak, issued May 1, 1973, and United Kingdom Patent Specification No. 723,019 filed Feb. 5, 1952 by Gevaert Photo-Producten N.V.

Silver halide emulsions useful in our invention are well-known to those skilled in the art. More details about their composition, preparation and coating are described, e.g., in Product Licensing Index, Vol. 92, December 1971, publication 9232, p. 107–109.

According to one embodiment, the silver halide emulsion layers in the invention comprise photosensitive silver halide dispersed in gelatin and are about 0.2 to 2 $\mu$m thick; the dye image-providing materials are dispersed in a polymeric binder permeable to alkaline solutions, such as gelatin, to form a separate layer of about 1 to 7 $\mu$m thick, in combination with polymeric interlayers permeable to alkaline solutions, e.g., gelatin, being about 1 to 5 $\mu$m thick. Of course, these thicknesses are approximate only and may be modified according to the product desired.

The support for the photographic elements of this invention may be any material as long as it does not deleteriously affect the photographic properties of the film unit and is dimensionally stable. Typical flexible sheet materials are paper supports, e.g. coated at one or both sides with an α-olefin polymer, e.g. polyethylene; they include cellulose nitrate film, cellulose acetate film, poly(vinyl acetal) film, polystyrene film, poly(ethylene terephthalate) film, polycarbonate film, poly-α-olefins such as polyethylene and polypropylene film, and related films or resinous materials. The support is usually about 0.05 to 0.15 mm thick.

For use in colour photography any material can be employed as the image-receiving layer as long as the desired function of mordanting or otherwise fixing the diffused dye will be obtained. The particular material chosen will, of course, depend upon the dye to be mordanted. If acid dyes are to be mordanted, the image-receiving layer can be composed of or contain basic polymeric mordants such as polymers of amino-guanidine derivatives of vinyl methyl ketone such as described in U.S. Pat. No. 2,882,156 of Louis M. Minsk, issued Apr. 14, 1959, and basic polymeric mordants and derivatives, e.g. poly-4-vinylpyridine, the 2-vinylpyridine polymer metho-p-toluene sulphonate and similar compounds described in U.S. Pat. No. 2,484,430 of Robert H. Sprague and Leslie G. Brooker, issued Oct. 11, 1949, the compounds described in the published German Patent Application No. 2,200,063 filed Jan. 11, 1971 by Agfa-Gevaert A. G. Suitable mordanting binders include, e.g. guanylhydrazone derivatives of acyl styrene polymers, as described e.g. in published German Patent Specification No. 2,009,498 filed Feb. 28, 1970 by Agfa-Gevaert A. G. In general, however, other binders, e.g. gelatin, would be added to the last-mentioned mordanting binders. Effective mordanting compositions are long-chain quaternary ammonium or phosphonium compounds or ternary sulphonium compounds, e.g. those described in U.S. Pat. Nos. 3,271,147 of Walter M. Bush and 3,271,148 of Keith E. Whitmore, both issued Sept. 6, 1966, and cetyltrimethyl-ammonium bromide. Certain metal salts and their hydroxides that form sparingly soluble compounds with the acid dyes may be used too. The dye mordants are dispersed in one of the usual hydrophilic binders in the image-receiving layer, e.g. in gelatin, polyvinylpyrrolidone or partly or completely hydrolysed cellulose esters.

Generally, good results are obtained when the image-receiving layer, which is preferably permeable to alkaline solution, is transparent and about 4 to about 10 μm thick. This thickness, of course, can be modified depending upon the result desired. The image-receiving layer may also contain ultraviolet-absorbing materials to protect the mordanted dye images from fading, brightening agents such as the stilbenes, coumarins, triazines, oxazoles, dye stabilizers such as the chromanols, alkyl-phenols, etc.

Use of pH-lowering material in the dye-image-receiving element of a film unit according to the invention will usually increase the stability of the transferred image. Generally, the pH-lowering material will effect a reduction of the pH of the image layer from about 13 or 14 to at least 11 and preferably 5 to 8 within a short time after inbibition. For example, polymeric acids as disclosed in U.S. Pat. No. 3,362,819 of Edwin H. Land, issued Jan. 9, 1968 or solid acids or metallic salts, e.g. zinc acetate, zinc sulphate, magnesium acetate, etc., as disclosed in U.S. Pat. No. 2,584,030 of Edwin H. Land, issued Jan. 29, 1952, may be employed with good results. such pH-lowering materials reduce the pH of the film unit after development to terminate development and substantially reduce further dye transfer and thus stabilize the dye image.

An inert timing or spacer layer may be employed in practice over the pH-lowering layer, which "times" or controls the pH reduction depending on the rate at which alkali diffuses through the inert spacer layer. Examples of such timing layers include gelatin, polyvinyl alcohol or any of the colloids disclosed in U.S. Pat. No. 3,455,686 of Leonard C. Farney, Howard G. Rogers and Richard W. Young, issued July 15, 1969. The timing layer may be effective in evening out the various reaction rates over a wide range of temperatures, e.g., premature pH reduction is prevented when inbibition is effected at temperatures above room temperature, e.g. at 35° to 37° C. The timing layer is usually about 2.5 μm to about 18 μm thick. Especially good results are obtained when the timing layer comprises a hydrolysable polymer or a mixture of such polymers that are slowly hydrolysed by the processing composition. Examples of such hydrolyable polymers include polyvinyl acetate, polyamides, cellulose esters, etc.

An alkaline processing composition employed in this invention can be a conventional aqueous solution of an alkaline material, e.g. sodium hydroxide, sodium carbonate or an amine such as diethylamine, preferably possessing a pH beyond 11.

According to one embodiment the alkaline processing liquid contains the diffusible developing agent that effects the reduction of the silver halide, e.g. ascorbic acid or a 3-pyrazolidinone developing agent such as 1-phenyl-4-methyl-3-pyrazolidinone.

The alkaline processing composition employed in this invention may also contain a desensitizing agent such as methylene blue, nitro-substituted heterocyclic compounds, 4,4'-bipyridinium salts, etc., to insure that the photosensitive element is not further exposed after it is removed from the camera for processing.

The solution also preferably contains a viscosity-increasing compound such as a high-molecular-weight polymer, e.g. a water-soluble ether inert to alkaline solutions such as hydroxyethylcellulose or alkali metal salts of carboxymethylcellulose such as sodium carboxymethylcellulose. A concentration of viscosity-increasing compound of about 1 to about 5% by weight of the processing composition is preferred. It will impart thereto a viscosity of about 100 mPa.s to about 200,000 mPa.s.

Processing may proceed in a tray developing unit as is present, e.g., in an ordinary silver complex diffusion transfer (DTR) apparatus in which the contacting with a separate dye image-receiving material is effected after a sufficient absorption of processing liquid by the photographic material has taken place. A suitable apparatus for said purpose is the COPYPROOF CP 38 (trade name) DTR-developing apparatus. COPYPROOF is a trade name of Agfa-Gevaert, Antwerpen/Leverkusen.

According to other embodiments wherein the receptor layer is integral with the photosensitive layer(s) the processing liquid is applied from a rupturable container or by spraying.

The rupturable container that may be employed in this invention may be of the type disclosed in U.S. Pat. Nos. 2,543,181 of Edwin H. Land, issued Feb. 27, 1951, 2,643,886 of Ulrich L. di Ghilini, issued June 30, 1953, 2,653,732 of Edwin H. Land, issued Sept. 29, 1953, 2,723,051 of William J. McCune Jr., issued Nov. 8, 1955, 3,056,492 and 3,056,491, both of John E. Campbell, issued Oct. 2, 1962, and 3,152,515 of Edwin H. Land, issued Oct. 13, 1964. In general such containers comprise a rectangular sheet of fluid- and air-impervious material folded longitudinally upon itself to form two walls that are sealed to one another along their longitudinal and end margins to form a cavity in which processing solution is contained.

While the alkaline processing composition used in this invention can be employed in a rupturable container, as described previously, to facilitate conveniently the introduction of processing composition into the film unit, other means of discharging processing composition within the film unit could also be employed, e.g., means injecting processing solution with communicating members similar to hypodermic syringes, which are attached either to a camera cartridge, as described in U.S. Pat. No. 3,352,674 of Donald M. Harvey, issued Nov. 14, 1967.

The main aspect of the present invention is the use of SETIC compounds from which by reduction and in alkaline medium a dye is released as photographically useful fragment. This is the reason why, in the following examples reference is made to a colour providing compound. The invention, however, is not at all limited to this aspect and it should be kept in mind that for various other purposes other photographically useful fragments may be present in these compounds instead of dyes or dye precursors.

The following examples further illustrate the invention. All percentages and ratios are by weight, unless otherwise mentioned.

EXAMPLE 1

A subbed water-resistant paper support consisting of a paper sheet of 110 g/sq.m coated at both sides with a polyethylene stratum of 15 g/sq.m was treated with a corona discharge and thereupon coated in the mentioned order with the following layers, the amounts relating to 1 sq.m of material:

| | | |
|---|---|---|
| (1) | an alkali-permeable colloid layer containing after drying per sq. m | |
| | gelatin | 2.68 g |
| | magenta dye-providing SETIC-compound 1 of Table 1 (applied from a dispersion prepared as described hereinafter) | 0.244 g (0.399 millimole) |
| | silver chloride expressed as $AgNO_3$ (applied from a gelatine-silver chloride emulsion) | 0.525 g |
| | ED-precursor compound 1 (applied from a dispersion prepared as described hereinafter) | 0.413 g (0.792 millimole) |
| (2) | anti-stress layer containing per sq. m | |
| | gelatin | '6.56 g |
| | 1-phenyl-3-pyrazolidinone as ETA-compound (applied from a dispersion prepared as described hereinafter) | 0.114 g |

Processing

A sheet of the obtained photographic material was exposed through a grey wedge having a constant 0.1 and thereupon contacted with the receptor material described hereinafter in the COPYPROOF CP 38 (trade name) diffusion transfer processing apparatus containing in its tray an aqueous solution comprising per liter:

| | | |
|---|---|---|
| sodium hydroxide | 7 | g |
| sodium orthophosphate | 25 | g |
| N—methyl-pyrrolidinone 80 | | ml |
| 1% ethanolic solution of 1-phenyl-2-tetrazoline-5-thione | 20 | ml |
| potassium bromide | 5 | g |
| distilled water up to | 1000 | ml |

Composition of the receptor material

To the same support as described for the above light-sensitive material a coating for forming an image-receiving layer having the following composition was applied per sq.m:

| | |
|---|---|
| gelatin | 5 g |
| triphenyl-n-hexadecylphosphonium bromide | 2 g |

The minimum and maximum optical density results after different contact times are listed in Table 2.

TABLE 2

| Contact time (min) | $D_{min}$ | $D_{max}$ |
|---|---|---|
| 1 | 0.11 | 1.00 |
| 4 | 0.12 | 1.88 |

Preparation of the dispersion of SETIC compound 1 of Table 1

1.7 g of SETIC compound 1 were dissolved in 8.5 ml of ethyl acetate at a temperature of 55° C. The solution was added to 25.5 g of a 10% aqueous gelatin solution containing 0.85 ml of MARLON A396 (trade name for an alkyl benzene sulphonate wetting agent of Hüls Chemische Werke AG, Marburg, Federal Republic of Germany) and 1.7 ml of ethyl acetate. Dispersing proceeded for 10 min in a high-speed stirring apparatus whereupon the ethyl acetate was removed by evaporation and the dispersion diluted with water up to reach a total weight of 34 g.

Preparation of the dispersion of 1-phenyl-3-pyrazolidinone

The preparation proceeded by sandmilling with the following ingredients:

| | | |
|---|---|---|
| gelatin | 40 | g |
| 1-phenyl-3-pyrazolidinone | 100 | g |
| 40% aqueous solution of LOMAR D (trade name) | 10 | ml |
| distilled water | 850 | ml |

(LOMAR D is a trade name of Nopco Chemical Company, Newark, N.J., U.S.A., for a naphthalene sulphonate condensate, formaldehyde being used in the condensation reaction).

Preparation of the dispersion of the ED-precursor compound 1 having the following structural formula:

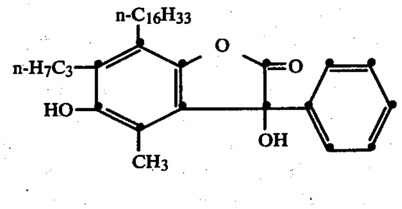

(prepared as described in DE-OS No. 3,006,268).

100 g of the ED-precursor compound 1 were dissolved in 500 ml of ethyl acetate at a temperature of 55° C. The resulting solution was added to 1 kg of a 10% aqueous gelatin solution to which 100 ml of MARLON A396 (trade name) and 100 ml of ethyl acetate had been added. Dispersing proceeded for 10 min in a high-speed stirring apparatus whereupon ethyl acetate was removed by evaporation and the dispersion diluted with water up to a total weight of 2 kg.

EXAMPLE 2

A photographic material was prepared in the same manner as described for example 1 but substituting magenta dye-providing SETIC compound 5 for SETIC compound 1 and using 0.539 mmol/sq.m of SETIC compound 5 as well as 1.11 mmol/sq.m of ED-precursor compound 1. Receptor material as well as processing conditions were as in example 1. The maximum optical density obtained after different contact times is given in Table 3.

TABLE 3

| Contact time (min) | 1 | 2 | 3 | 4 |
|---|---|---|---|---|
| $D_{max}$ | 0.64 | 1.31 | 1.68 | 1.70 |

We claim:

1. A photographic silver halide material comprising a support carrying at least one unexposed alkali-permeable silver halide hydrophilic colloid emulsion layer and containing a compound, which is immobile in an alkali-permeable colloid medium when contacted with an alkaline liquid and which is capable of being reduced by a silver halide developing agent at a rate slower than that of image-wise developable silver halide in the photographic material and in reduced state is capable of releasing a photographically useful group, characterized in that said compound corresponds to the following general formula:

$$R^{10}-(L^1)_p-\overset{\overset{\displaystyle NO_2}{|}}{\underset{\underset{\displaystyle (L^2)_q-R^{20}}{|}}{C}}-Z-PUG$$

wherein:

$R^{10}$ and $R^{20}$ (same or different)

(1) represent an alkyl group, a cycloalkyl group, an alkenyl group, a cycloalkenyl group or an aralkyl group, (2) represent an aryl group, or (3) represent a heterocyclic ring residue, or $R^{10}$ and $R^{20}$ are ringclosed, either $R^{10}$ or $R^{20}$ containing a ballasting group conferring diffusion resistance to the compound in hydrophilic colloid media when penetrated by an aqueous alkaline liquid;

$L^1$ and $L^2$ (same or different) represent a $$-\underset{\underset{\displaystyle O}{\|}}{C}-;$$

$-SO_2-$; $-NHCO-$; $-NHSO_2-$;

$$-O-\underset{\underset{\displaystyle O}{\|}}{C}-;$$

$-O-SO_2-$ or $$-\underset{\underset{\displaystyle O}{\|}}{C}-\underset{\underset{\displaystyle O}{\|}}{C}-$$

group;

p and q (same or different) represent an integer 0 or 1;

Z represents an atom or an atom group which is electronegative with respect to carbon, and PUG represents together with Z a releasable photographically useful group.

2. A photographic material according to claim 1, characterized in that Z represents —S— or $-SO_2-$.

3. A photographic material according to claim 1, characterized in that PUG represents a dye group or a shifted dye group.

4. A photographic material according to claim 1, characterized in that it comprises a support carrying (1) a red-sensitive silver halide emulsion layer having operatively associated therewith a said compound that is initially immobile in an alkali-permeable colloid medium and wherefrom through the reducing action of a silver halide developing agent a cyan dye is split off in diffusible state, (2) a green-sensitive silver halide emulsion layer having operatively associated therewith said compound of (1) with the difference that a magenta dye is split off in diffusible state, and (3) a blue-sensitive silver halide emulsion layer having operatively associated therewith said compound of (1) with the difference that a yellow dye is split off in diffusible state.

5. A photographic material according to claim 3, characterized in that the dye group is a shifted dye group.

6. A photographic material according to claim 1, characterized in that the silver halide emulsion layer(s) is (are) negative working.

7. A photographic material according to claim 1, characterized in that the photosensitive silver halide emulsion layer(s) is (are) negative-working and applied to the same support as a non-light-sensitive receptor layer so as to form an integral combination of light-sensitive layer(s) with the non-light-sensitive receptor layer and an opaque layer, which is alkali-permeable, reflective to light and located between the receptor layer and the silver halide emulsion layer(s).

8. A photographic material according to claim 1, characterized in that the material is a film unit that is adapted to be processed by passing said unit between a pair of juxtaposed pressure-applying members, said unit comprising (1) a photosensitive element, which contains a silver halide emulsion layer having associated therewith said compound that is initially immobile in an alkali-permeable colloid medium and wherefrom through the reducing action of a silver halide developing agent a dye is split off in diffusible state, (2) an image dye-receiving layer, (3) means for discharging an alkaline processing composition within the film unit, said means being a rupturable container, which is adapted to be positioned during processing of the film so that a compressive force applied to the container by the pressure-applying members will effect a discharge of the container's contents within the film, and (4) a silver halide developing agent, which is soluble in an alkaline processing composition located within said film unit.

9. A photographic material according to claim 1, characterized in that the silver halide emulsion layer(s) contain(s) a silver halide developing agent.

10. A photographic material according to claim 1, characterized in that said compound is present in a hydrophilic colloid layer adjacent to a silver halide emulsion layer.

11. A photographic material according to claim 1, characterized in that the photographic material includes as developing agent a hydroquinone compound or a 1-aryl-3-pyrazolidinone compound.

12. A photographic material according to claim 1, characterized in that the compound(s) are used in the photographic material in conjunction with a mixture of reducing agents at least one of which is a compound called electron donor (ED-compound) or electron donor precursor compound (EDP-compound) and at least one of which is a compound called electron-transfer agent (ETA-compound).

13. A photograhic material according to claim 12, characterized in that the EDP-compound is a benzofuran derivative corresponding to the following general formula:

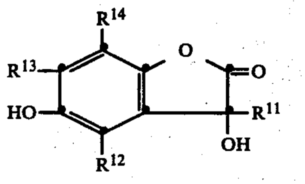

wherein:

$R^{11}$ represents a carbocyclic or heterocyclic aromatic ring, $R^{12}$, $R^{13}$ and $R^{14}$ (same or different) represent hydrogen, alkyl, alkenyl, aryl, alkoxy, alkylthio, amino, or $R^{13}$ and $R^{14}$ represent together an adjacent carboxyclic ring, and wherein at least one of $R^{11}$, $R^{12}$, $R^{13}$ and $R^{14}$ represent a ballast group having from 10–22 carbon atoms.

14. A photographic material according to claim 12, characterized in that the ED- or ED-precursor compound is present in the photographic material in a molar ratio of 1:1 to 8:1 with respect to the compound capable of releasing the photographically useful group.

* * * * *